(12) United States Patent
Akemi et al.

(10) Patent No.: US 7,749,586 B2
(45) Date of Patent: Jul. 6, 2010

(54) ADHERING MEMBER AND METHOD FOR PRODUCING ADHERING MEMBER

(75) Inventors: Hitoshi Akemi, Osaka (JP); Kazuhiro Higashio, Osaka (JP)

(73) Assignee: Nitto Denko Corporation, Osaka (JP)

( * ) Notice: Subject to any disclaimer, the term of this patent is extended or adjusted under 35 U.S.C. 154(b) by 633 days.

(21) Appl. No.: 10/140,053

(22) Filed: May 8, 2002

(65) Prior Publication Data

US 2003/0000639 A1   Jan. 2, 2003

(30) Foreign Application Priority Data

May 17, 2001   (JP) .............................. 2001-148051

(51) Int. Cl.
*B32B 9/00* (2006.01)
*B32B 33/00* (2006.01)
*B65D 65/28* (2006.01)

(52) U.S. Cl. .................... 428/40.1; 428/41.8; 428/42.2; 428/42.3; 428/43

(58) Field of Classification Search ................ 428/40.1, 428/41.8, 42.2, 42.3, 43
See application file for complete search history.

(56) References Cited

U.S. PATENT DOCUMENTS

| | | | | |
|---|---|---|---|---|
| 2,971,863 A | * | 2/1961 | Kindseth et al. ............ | 428/352 |
| 3,230,649 A | * | 1/1966 | Karn ........................... | 40/638 |
| 3,626,143 A | * | 12/1971 | Fry ........................ | 219/121.69 |
| 3,690,999 A | | 9/1972 | Setzer | |
| 4,080,878 A | * | 3/1978 | Gallagher et al. ........... | 493/378 |
| 4,549,063 A | | 10/1985 | Ang et al. | |
| 4,988,550 A | * | 1/1991 | Keyser et al. .............. | 428/41.1 |
| 5,078,427 A | * | 1/1992 | Ishii et al. ..................... | 283/81 |
| 5,665,473 A | * | 9/1997 | Okoshi et al. ............... | 428/457 |
| 6,277,001 B1 | * | 8/2001 | Saito ........................... | 451/41 |

FOREIGN PATENT DOCUMENTS

| | | |
|---|---|---|
| DE | 1 043 556 B | 11/1958 |
| DE | 24 04 682 A | 8/1975 |
| DE | 2404682 * | 8/1975 |
| DE | 3623985 A1 * | 1/1988 |
| GB | 1121057 A * | 7/1968 |
| JP | 04-012834 A | 1/1992 |
| JP | 10-067652 A | 3/1998 |
| JP | 2000-166965 A | 6/2000 |

OTHER PUBLICATIONS

Derwent abstract of RD 211015A, Nov. 10, 1981.*
Derwent abstract of DE3623985A1, see above.*
Derwent abstract of GB1121057, see above.*

* cited by examiner

*Primary Examiner*—Victor S Chang
(74) *Attorney, Agent, or Firm*—Sughrue Mion, PLLC

(57) ABSTRACT

An adhering member comprises an adhesive layer 2 of a thickness R formed on one surface of a backing 1, and a liner 3 of a thickness T laminated on the adhesive layer, and has a half-cut formed in the liner for making handleability satisfactory while preventing seepage of contents. The adhering member excellent in handleability and stability is obtained by providing, for example, the half-cut 4 having a rectangular or inverted triangular sectional shape, a groove width of 200 μm or less, and a groove depth of more than 14T/15 but less than (T+R).

5 Claims, 3 Drawing Sheets

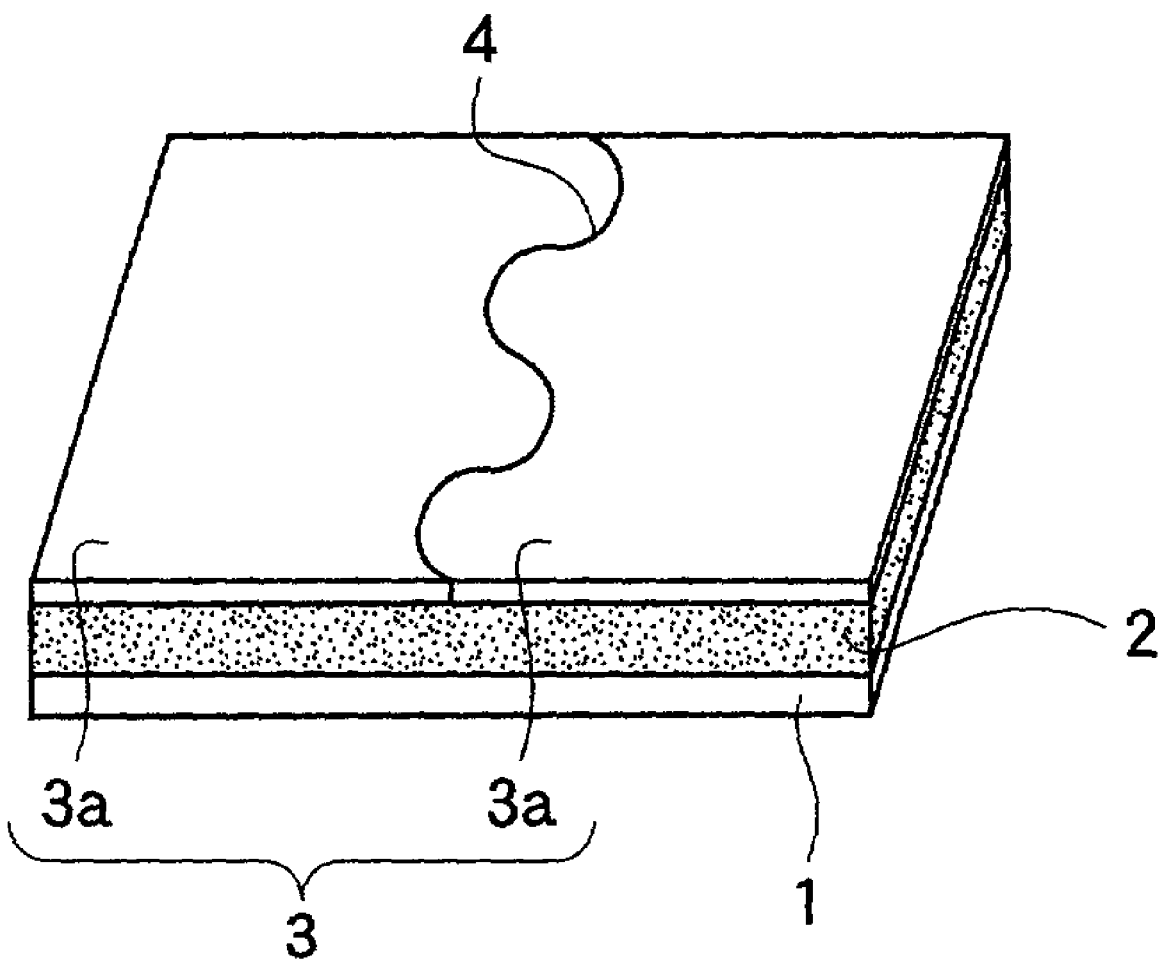

ADHERING MEMBER AND METHOD FOR PRODUCING ADHERING MEMBER

BACKGROUND OF THE INVENTION

1. Field of the Invention

The present invention relates to an adhering member, and a method for producing the adhering member. More specifically, the invention relates to an adhering member having a liner on an adhesive layer, and a method for producing the adhering member.

2. Description of a Related Art

In recent years, various adhering members have been developed, such as percutaneously absorbed preparations for administering drugs through the skin, and adhesive plasters. FIGS. 6 and 7 are perspective views each showing an example of such an adhering member. In the adhering member, an adhesive layer 2 is laminated on a backing 1 comprising a cloth or a plastic film. A so-called liner 3 is provided on the adhesive layer 2 in order to protect an exposed surface of the adhesive layer 2, or to enhance the supporting properties of the flexible backing 1 and improve the operability (handleability) of the adhering member when applied to the skin.

These adhering members are excellent from the point of view of administering drugs continuously through the skin, or protecting wounded sites. To improve the performance of adhering members, technological developments of adhesives and backings have been encouraged, and advances in these materials are made year by year.

At the final stage of development of adhering members, however, problems often arise about their cost, operability, and stability meaning that pharmaceutical components of percutaneously absorbed preparations, etc. have to be retained up to a time when the preparations are used. Solving these problems often poses difficulty. The problem about the cost, in particular, is often fatal, leading to redesigning. The problem concerned with stability, if any, may be soluble by a packaging material for sealed packaging of the adhering member. In this case, the cost of the packaging material is so high as to disadvantage the development of the adhering member.

If a problem occurs about operability, it may be solved by a mere improvement in the releasability of the liner. Formation of, say, a half-cut of a suitable linear shape in the liner can resolve the problem. For example, the linear shape of the half-cut (the shape of a line appearing on the surface of the liner) is changed from a straight line as shown in FIG. 6 to a wavy line as show in FIG. 7, whereby the release properties can be improved to solve the problem of operability. These half-cuts 4 can be formed by cutting the liner 3, laminated on the adhesive layer 2, by means of a die cutting roll. In the drawings, the numerals 3a, 3a denote liner pieces divided by the half-cut 4.

However, a mere change in the line shape of the half-cut 4 may result in poor stability. Thus, this measure cannot be an effective measure capable of relieving the above-described problems overall while taking the stability and the manufacturing cost into account. Changing the shape of the line, moreover, also requires a change in the shape of the cutter, presenting a disadvantage to the cost. Thus, even if the problem of stability can be solved, a new problem of cost will arise.

SUMMARY OF THE INVENTION

The inventors of the present invention have made earnest efforts to solve the foregoing problems. They have changed the shape (sectional shape) of the half-cut variously, and found that an adhering member excellent in handleability and stability can be obtained at a low cost by a relatively simple method. Based on this finding, they have accomplished the present invention.

An adhering member according to a first aspect of the present invention is an adhering member comprising an adhesive layer of a thickness R formed on one surface of a backing, and a liner of a thickness T laminated on the adhesive layer, and wherein a half-cut is formed in the liner for making handleability satisfactory while preventing seepage of contents.

Here, the adhesive layer may contain less than 25% by weight of an additive for adjusting adhesiveness, and the half-cut has a groove width of 200 µm or less, and a groove depth of more than 14T/15 but less than (T+R).

Here, a sectional shape of the half-cut may be a rectangular shape or an inverted triangular shape.

The groove width of the half-cut may be less than 50 µm.

The groove width of the half-cut is not less than 50 µm but not more than 200 µm, and protuberances are present in groove edge portions of a surface of the liner.

The adhesive layer may contain not less than 25% by weight but less than 70% by weight of an additive for adjusting adhesiveness, and the half-cut has a rectangular sectional shape having protuberances in groove edge portions, has a groove width of 200 µm or less but 50 µm or more, and has a groove depth of more than 14T/15 but less than (T+R).

The adhesive layer may contain not less than 25% by weight but less than 70% by weight of an additive for adjusting adhesiveness, and the half-cut has a rectangular sectional shape formed by use of a die roll having a blade tip angle of less than 45°, has a groove width of less than 20 µm, and has a groove depth of more than 14T/15 but less than (T+R).

The adhesive layer may contain not less than 25% by weight but less than 70% by weight of an additive for adjusting adhesiveness, and the half-cut has an inverted triangular sectional shape, has a groove width of 200 µm or less, and has a groove depth of more than 14T/15 but less than (T+R).

According to a second aspect, the present invention provides a method for producing an adhering member comprising the steps of: forming an adhesive layer on one surface of a liner; providing a backing on the adhesive layer; and irradiating a surface of the liner with a laser beam to form a predetermined half-cut in the liner.

Here, the half-cut may have a rectangular sectional shape having protuberances in groove edge portions in the surface of the liner, may have a groove width of 200 µm or less, and may have a groove depth of more than 14T/15 but less than (T+R).

According to a third aspect, the present invention provides a method for producing an adhering member comprising the steps of: forming an adhesive layer on one surface of a liner; providing a backing on the adhesive layer; and using a razor on a surface of the liner to form a predetermined half-cut.

Here, a sectional shape of the half-cut may be an inverted triangular shape.

According to a fourth aspect, the present invention provides a method for producing an adhering member comprising the steps of: forming an adhesive layer on one surface of a liner; providing a backing on the adhesive layer; and partially cutting the liner while temporarily releasing the liner, and then bonding the liner again onto the adhesive layer to form a predetermined half-cut.

Here, cutting of the liner may be performed using a die roll.

Cutting of the liner may be performed using a razor.

The half-cut may have a rectangular sectional shape and a groove width of 15 μm or less.

The above and other objects, effects, features and advantages of the present invention will become more apparent from the detailed description to follow taken in conjunction with the accompanying drawings.

BRIEF DESCRIPTION OF THE DRAWINGS

FIG. 7 is a perspective view showing an adhering member which is another mode of the conventional example.

DETAILED DESCRIPTION

Figure 1:
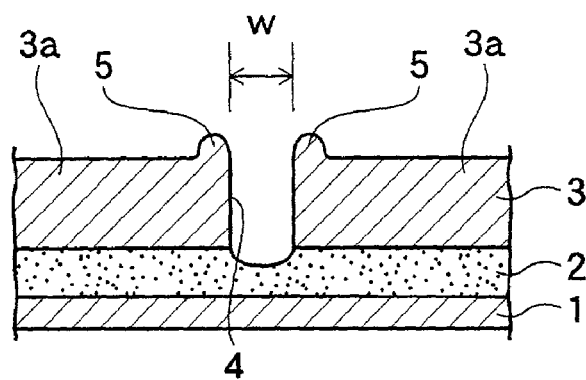
FIG. 1 is a sectional view showing a part of an adhering member according to a first embodiment of the present invention.

The present invention will now be described in detail with reference to the accompanying drawings. The same constituent elements are assigned the same reference numerals, and their explanations are omitted.

FIG. 1 is a sectional view showing a part, including a half-cut, of an adhering member according to a first embodiment of the present invention. The adhering member of this embodiment has practically the same layer structure as that of a conventional adhering member. The adhering member of the present embodiment comprises an adhesive layer 2 laminated on a backing 1 in the form of a tape or a sheet, and a liner 3 laminated on the adhesive layer 2. This adhering member is similar to the conventional adhering member in that it is also provided with a half-cut 4, which divides the liner 3 into two liner pieces 3a, 3a. However, the sectional shape of the half-cut 4 in the adhering member of the present embodiment is different from that in the conventional adhering member.

The half-cut 4 of the adhering member shown in FIG. 1 has a nearly rectangular groove-like sectional shape. In the present invention, the "rectangular shape" is not restricted to a rectangular shape with four right angles, such as a rectangle or a square, but it also includes a nearly rectangular shape curved at some sides as shown in FIG. 1, or very slightly distorted in a trapezoidal form. That is, a half-cut in a nearly rectangular sectional shape may be formed according to the method of machining the half-cut. Such a shape is included in the rectangular shape in the present invention.

The groove width w of the half-cut 4 is set at 200 μm or less. In the adhering member according to the first embodiment of the present invention, the depth of the half-cut 4 is at least the thickness of the liner 3, and slightly reaches the adhesive layer 2. Herein, the depth of the half-cut, namely, the depth of the groove, refers to the distance from the flat portion of the liner surface to the deepest site of the bottom of the groove.

Figure 6:
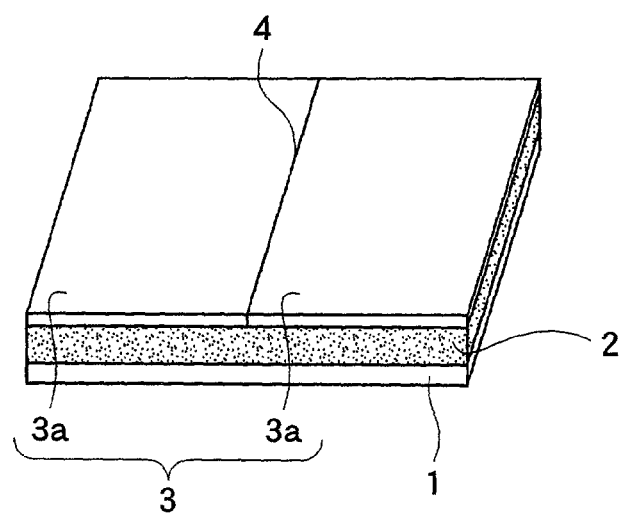
FIG. 6 is a perspective view showing an adhering member which is a conventional example.

The half-cut 4 can be provided easily by laser beam machining. For laser beam machining, a cutting method using, for example, a $CO_2$ laser or a YAG laser, is named. The half-cut 4 having the above-mentioned sectional shape may be machined such that the shape of a line appearing on the liner surface (hereinafter referred to as a shape "when viewed from top") is a straight line, as shown in FIG. 6, or can be machined in a snaking curved form (in a wavy line) when viewed from top as shown in FIG. 7.

The conditions for the laser beam machining differ according to the material for or the thickness of the liner 3 applied. By adjusting the laser output or the scanning speed of the laser beam, the half-cut 4 of the desired sectional shape can be easily created. If the liner 3 is a 75 μm thick polyester liner, for example, the use of a laser beam machining device (power consumption 450 VA) can apply the half-cut 4 of the above sectional shape at 75% of its maximum output and its scanning speed of 200 to 300 mm/sec.

In the adhering member shown in FIG. 1, the liner 3 is completely divided into the two liner pieces 3a, 3a, and a gap is provided between the two liner pieces 3a and 3a. Thus, when the liner 3 is stripped, the end surfaces of the liner pieces 3a, 3a do not contact, and the liner can be released smoothly. Therefore, the handleability of the release material can be improved markedly. On the other hand, the adhesive layer 2 is slightly exposed, and there is a risk of the adhesive or additive seeping out of the exposed area. However, seepage of the adhesive, etc. can be prevented by setting the groove width w at 200 μm or less. Hence, the groove width w may be 200 μm or less, but is preferably set at 50 μm or more. The groove width in excess of 200 μm would result in too broad a surface of the adhesive layer 2 exposed, exerting a great adverse influence on stability for the reasons stated earlier. If the groove width w is less than 50 μm, sufficient release properties or handleability may fail to be ensured. During machining, moreover, protuberances 5 to be described below may contact each other, adversely affecting handleability.

Herein, a protuberance 5 of a nearly semicircular sectional shape is further formed at a groove edge portion along the half-cut 4 on each surface of the liner on each side of the half-cut 4 (i.e., the liner piece 3a). To release the liner 3, it is common practice to fold the adhering member in two at the site of the half-cut 4, and strip the liner piece 3a from the adhesive layer while raising an end portion of the liner piece 3a. In this case, if the protuberance 5 is provided at the end portion of the liner piece 3a, the thickness of the liner end portion increases, making it very easy to peel the liner. An elderly person, who has difficulty in freely moving the finger tip, can release the liner in the adhering member having such a protuberance in the liner. The size of the protuberance 5 is not limited, but depends on the groove width or depth of the half-cut 4, and the height of the protuberance (the distance from the flat portion of the liner surface to the highest position of the protuberance) is generally set at 30 to 100 μm. The protuberance 5 can be easily formed by the above-mentioned laser beam machining.

Figure 2:
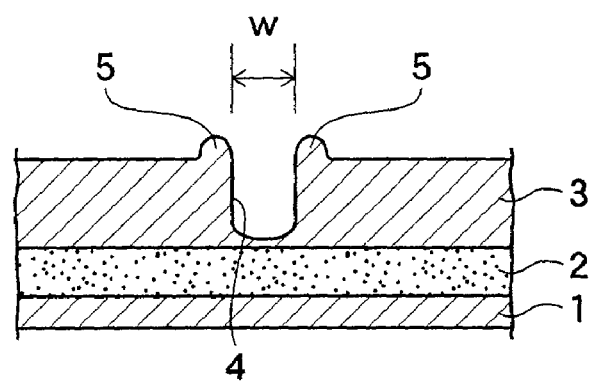
FIG. 2 is a sectional view showing a part of an adhering member according to a second embodiment of the present invention.

Next, an adhering member according to a second embodiment of the present invention will be described. A half-cut 4 of the adhering member shown in FIG. 2 takes practically the same shape as the sectional shape shown in FIG. 1. However, the depth of the groove does not reach an adhesive layer 2, and two liner pieces 3a are connected at the bottom (a connecting portion) of the half-cut 4. In these respects, the shape of the half-cut 4 in FIG. 2 is different from the sectional shape shown in FIG. 1. To adjust the adhesiveness of the adhesive layer in the adhering member, an additive may be incorporated into the adhesive. If a large amount of the additive is incorporated, the adhesive or additive may seep from the half-cut 4 through the influence of the additive contained in the adhesive layer 2, because the adhesive layer 2 is partly exposed in the adhering member shown in FIG. 1. As a result, handleability may be impaired, or stability of the adhering member tends to be affected adversely. However, as with the adhering member shown in FIG. 2, the groove of the half-cut 4 is made not so deep as to reach the adhesive layer 2, and the adhesive layer 2 is covered with the very thin liner 3 at the bottom of the groove. Consequently, the handleability of the adhering member can be improved, with the aforementioned drawbacks being prevented.

The thickness of the liner 3 at the bottom (connecting portion) of the half-cut 4 differs according to the material for the liner, etc. As small a thickness as possible is preferred, and the thickness should be set such that the liner 3 can be easily split into two liner pieces 3a. Concretely, the thickness of the connecting portion is desirably set to be less than $1/15$ of the thickness of the liner 3. In other words, the thickness of the connecting portion is desirably set such that the depth of the groove of the half-cut 4 is more than $14/15$ (if the thickness of the liner 3 is designated as T, more than 14T/15, but less than T) of the thickness of the liner 3. If the depth of the groove of the half-cut is less than 14T/15, the possibility increases that the liner 3 cannot be split into two at the half-cut 4 at the time of release of the liner 3.

By imparting the above-described sectional shape to the half-cut 4, it becomes possible to ensure handleability while preventing seepage of the adhesive and additive, even if the adhesive layer contains the additive in a large amount, for example, of 40%. That is, an extremely simple modification in design, i.e., the change in the sectional shape of the half-cut 4, permits the provision of the adhering member excellent in handleability and taking stability into account, without posing the problem of cost.

Figure 3:
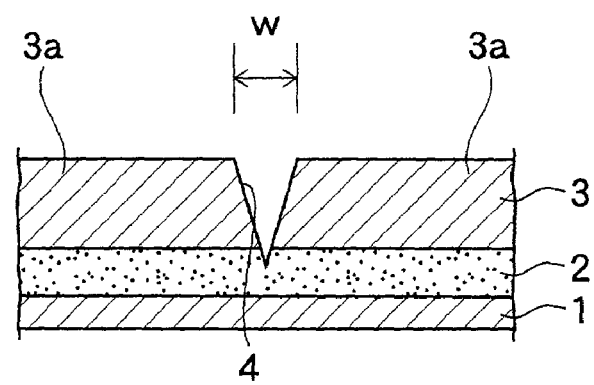
FIG. 3 is a sectional view showing a part of an adhering member according to a third embodiment of the present invention.

FIG. 3 shows a sectional view of a part of an adhering member according to a third embodiment of the present invention. In the adhering member shown in FIG. 3, the section of the groove of a half-cut 4 is formed in a nearly inverted triangular shape (a V-shape), and the depth of the groove reaches an adhesive layer 2. If machined in this shape, the half-cut 4 has some groove width, and a gap is formed between liner pieces 3a on the surface portion of a liner 3. Thus, the liner pieces 3a become releasable more easily than in the conventional adhering member. The bottom of the groove of the half-cut 4 (i.e., the front end portion of the V-shape) is acute-angled. An adhering member of this sectional shape is substantially smaller in the seeping amount of the adhesive, etc. than an adhering member provided with a half-cut of a rectangular sectional shape having a groove of the same depth. Even when the half-cut 4 of such a shape is provided, the handleability of the adhering member can be improved without its stability deteriorated, and the reliability of the product can be enhanced free of cost.

The expression "inverted triangular shape" in the present invention includes a nearly inverted triangular shape, and the shape of the triangle includes not only an isosceles triangle, but also a right triangle and even a slightly distorted triangle or a triangle having a curved side. The angle corresponding to the front end portion of the groove of the half-cut may be determined naturally by the method of machining the half-cut or the material to be machined. However, the angle is not limited, but is determined as desired.

The groove-shaped half-cut 4 of an inverted triangular sectional shape can be easily formed by use of a razor (blade). The groove width w of the half-cut 4 is relatively determined by the thickness of the liner 3 and the thickness of the adhesive layer 2, and is set such that the groove width at the boundary between the liner 3 and the adhesive layer 2 is generally 50 to 200 μm.

Figure 4:
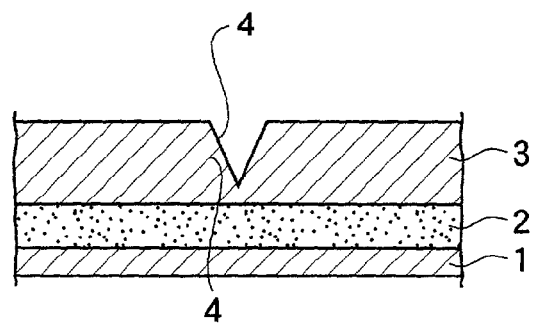
FIG. 4 is a sectional view showing a part of an adhering member according to a fourth embodiment of the present invention.

The depth of the groove of the half-cut 4, as in an adhering member shown in FIG. 4, need not be of such a degree that the liner 3 is completely cut. That is, this depth can be such that the depth of the groove of the half-cut 4 does not reach the adhesive layer 2, and the adhesive layer 2 is not exposed. In this case, the thickness of the liner at the groove bottom portion (connecting portion) of the half-cut 4 is preferably as small as possible, and the thickness of the liner at the connecting portion is preferably less than $1/15$ of the thickness of the liner. In other words, the depth of the groove of the half-cut 4 is preferably set to be more than $14/15$ (if the thickness of the liner=T, more than 14T/15, but less than T) of the thickness of the liner. By setting the thickness of the liner at the connecting portion at such a thickness, the liner 3 can be easily split into two liner pieces 3a. Since the front end of the groove of the half-cut is acute-angled, moreover, there is the advantage that the liner can be torn easily as compared with the liner having a half-cut of a rectangular sectional shape as shown in FIG. 2.

Figure 5:
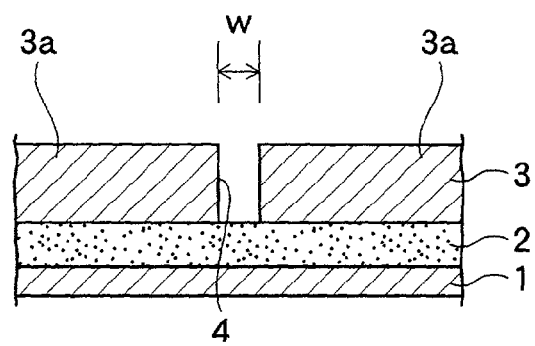
FIG. 5 is a sectional view showing a part of an adhering member according to a fifth embodiment of the present invention.

In the present invention, a half-cut 4, whose sectional shape is a simple rectangle without having the aforementioned protuberances 5, may be formed as in an adhering member shown in FIG. 5. In the present embodiment, the groove width w may be less than 50 μm, and is desirably set at 15 μm or less. If the content of an additive in the adhesive layer 2 is 30% or less, for example, the groove width w of 15 μm or less can result in the prevention of seepage of the adhesive, and stability can be ensured. Furthermore, handleability is also improved.

The half-cut 4 can be provided by laser beam machining, and can also be easily provided by die cutting using a die cutting device. That is, a liner is cut by a die cutting device, while being released from a laminate composed of a backing, an adhesive layer, and the liner and wound in a roll form. Immediately thereafter, the liner is bonded again onto the adhesive layer, whereby the adhering member of the shape shown in FIG. 5 can be obtained.

The material for use as the backing, the adhesive or the liner used in the adhering member of the present invention is not limited, and various materials hitherto known to the public are used. In the present invention, however, which sectional shape should be selected for the half-cut is important, and the selection is made, as desired, depending on the characteristics of the adhering member, especially, the composition of the adhesive layer, the material for the liner, and so on.

For the backing 1, various plastic films, nonwoven fabrics, paper, woven fabrics, and knitted fabrics, for example, are used. Examples of the plastic films are various films comprising polyvinyl chloride, copolymers of polyvinyl chloride with ethylene, propylene, vinyl acetate, acrylic acid, acrylic ester, methacrylic acid, methacrylic ester, acrylonitrile, styrene, or vinylidene chloride and other monomers, olefin polymers, such as polyethylene, polypropylene or ethylene-vinyl acetate copolymer, polyester polymers such as polyethylene terephthalate or polyether polyester, and polyamide polymers such as polyether polyamide block polymer. Of these backings, a preferred one is selected, as desired, according to the purpose of use.

The adhesive is not limited, and an acrylic adhesive, a rubber adhesive, a silicone adhesive, or a urethane adhesive is used. Any of these adhesives may be subjected, if necessary, to physical crosslinking by irradiation, such as irradiation with ultraviolet rays or electron rays, or chemical crosslinking using various crosslinking agents, such as isocyanate compounds including trifunctional isocyanates, organic peroxides, organic metal salts, metal alcoholates, metal chelate compounds, or polyfunctional compounds (polyfunctional external crosslinking agents, or polyfunctional internal crosslinking monomers such as diacrylates or dimethacrylates).

The material for the liner is not limited, as long as a groove-shaped half-cut having the aforementioned predetermined sectional shape can be provided in the liner. However, if the ease of machining or the precision of machining is considered, a material having a uniform thickness is desirable, while too thick a material or too hard a material is not preferred. Examples of the material for the liner are a polyethylene film (PE), a polypropylene film (PP) and a polyester film (PET). A composite film comprising any of these materials bonded to paper, or a material comprising paper alone can also be used preferably.

As described above in detail, the present invention can ensure the excellent stability or handleability of the adhering member, without paying much cost, by selecting, as desired, the sectional shape of the half-cut according to the characteristics of the adhesive or the backing.

EXAMPLES

Various adhering members were prepared, and their handleability and stability were evaluated. Tables 1 to 3 show the types of raw adhering members used in the preparation of the various adhering members, and the conditions for machining of the half-cut.

<Production of Adhesive>

A polymerization device with an internal volume of 1,000 L was charged with 228 kg of 2-ethylhexyl acrylate (TOAGOSEI CO., LTD.), 12 kg of acrylic acid (TOAGOSEI CO., LTD.), and 60 kg of ethyl acetate (Showa Denko K.K.). The interior of the polymerization device was purged with nitrogen, with the charge being maintained at 40° C. and a rotor being rotated at 30 rpm. Separately, 385 kg of ethyl acetate for dropwise addition was placed in a dropping device. Then, a solution of 640 g of "Naiiper BW" (trade name, Mitsui Toatsu Chemicals, Inc.) in ethyl acetate was added as an initiator, and polymerization was performed for 12 hours at an internal bath temperature of 60±2° C. Temperature control was carried out by the adjustment of an external bath temperature and dropwise addition of ethyl acetate. After completion of the reaction, the external bath temperature was raised to 80° C., and heating was continued for a further 25 hours. Finally, all of the remaining amount of ethyl acetate for dropwise addition was added dropwise, and the reaction mixture was cooled to obtain an adhesive solution.

<Production of Raw Adhering Member for Adhering Member>

① Production of Raw Adhering Member A

Ethyl acetate was added to the adhesive solution to adjust its viscosity, thereby preparing a coating solution (A) for an adhesive layer. A surface, for release treatment, of a 75 μm thick, 60 cm wide polyester liner (Mitsubishi Chemical Polyester film Corporation) was coated with the coating solution for an adhesive layer by a coating machine having a comma-coater and a two-zone drying tower so that the width of the adhesive layer would be 58 cm and its thickness after drying would be 60 μm. Then, the coating was dried, whereafter a 60 cm wide, 12 μm thick polyester film (Mitsubishi Chemical Polyester film Corporation) was laminated thereon to obtain a raw adhering member roll (laminate) measuring a total length of 500 m. This raw adhering member roll was cut with the use of a slitter to prepare a 7 cm wide raw adhering member A for testing.

② Production of Raw Adhering Member B

To 75 parts by weight of the solid matter of the above-described adhesive solution, 25 parts by weight of isopropyl myristate was added as an additive. "Colonate HL" (trade name, Nippon Polyurethane Industry Co., Ltd.) was also added as a crosslinking agent in an amount of 0.2 wt % based on the solid content of the adhesive. Further, ethyl acetate was added until a solute content of 25 wt %, making the total amount 100 kg. The mixture was stirred for 20 minutes by means of a high speed dispersing machine to obtain a coating solution (B) for an adhesive layer. The same procedure as in the preparation of the raw adhering member A was performed, except that the coating solution (A) for an adhesive layer was replaced by the coating solution (B) for an adhesive layer. In this manner, a raw adhering member roll was obtained. This raw adhering member roll was heat-treated for 48 hours at 70° C., and cut with the use of a slitter to prepare a 7 cm wide raw adhering member B for testing.

③ Production of Raw Adhering Member C

A raw adhering member C for testing was prepared in the same manner as in the production of the raw adhering member B, except that isopropyl myristate was incorporated such that the ratio of the adhesive solids and the isopropyl myristate blended was 50:50.

<Machining of Half-Cut>

① Laser Cutting

A cutting device (Kentoku Sangyo Co.) incorporating a laser marker ML9100 (Keyence Corporation, $CO_2$ laser, power consumption 450 VA) was used on the liner of each of the various raw adhering members to create a half-cut at a laser output of 75% and a scanning speed of 70 to 400 mm/sec, as shown in Table 1. Then, a 5 cm by 5 cm square piece was cut from the raw adhering member to prepare an adhering member. This adhering member was sealed packaged in a packaging material (TOYO ALUMINIUM K.K.) having an inner surface comprising hytolon resin.

② Razor (Blade) Cutting

As shown in Table 2, a ceramic razor was advanced into the liner of each of the various raw adhering members using a slitter S300 (Sanwa Giken Corporation) at a transport speed of 30 m/min to provide a half-cut. Then, a 5 cm by 5 cm square piece was cut from the raw adhering member to prepare an adhering member. This adhering member was sealed packaged in a packaging material (TOYO ALUMINIUM K.K.) having an inner surface comprising hytolon resin.

③ Die Cutting

A die cutter (Nitto Seiki Inc., die roll: Koto Chokoku K.K.) having a blade tip angle of 20°, 30° or 45° was used. As shown in Table 3, with each of the raw adhering members being transported, the liner was once stripped from the adhesive layer, and the liner was cut in the direction of transport by the die roll. Then, the liner was immediately bonded again to the adhesive layer, and the laminate was taken up. Then, a 5 cm by 5 cm square piece was cut from the raw adhering member to prepare an adhering member. This adhering member was sealed packaged in a packaging material (TOYO ALUMINIUM K.K.) having an inner surface comprising hytolon resin.

<Evaluation Method>

Each of the adhering members packaged in a sealed condition was stored for 3 months at 40° C. The adhering member after storage was evaluated by male panelists (aged 55 years and more) for handleability (ease of release of the liner) on a scale of five grades (the highest grade: "5 points" for satisfactory handleability, the lowest grade: "1 point" for poor handleability). The inner surface of the packaging material was visually observed, and no seepage of the adhesive, etc. was expressed as "○"; slight, negligible seepage of the adhesive, etc. as "Δ"; discernible seepage as "X"; and severe seepage as "X X". The sectional shape of the half-cut was observed with a microscope (Keyence Corporation). Each of the adhering members was also evaluated overall. In the tables, the symbol "-" represents evaluation unnecessary or evaluation impossible.

<Results of Investigation>

The results of evaluation after laser machining are shown in Table 1, the results of evaluation after razor cutting in Table 2, and the results of evaluation after die cutting in Table 3. As the respective tables indicate, the adhering members having half-cuts of sectional shapes according to the present invention are excellent in handleability. That is, adhering members with satisfactory handleability can be obtained by selecting, as desired, the sectional shape of a half-cut according to the characteristics of the adhesive layer. For example, a half-cut of a predetermined groove width is formed by laser beam machining, and protuberances are formed on the liner surface along and on both sides of the groove, whereby adhering members with satisfactory handleability and excellent stability are obtained (Nos. 2, 3, 4, 8, 9, 14 and 15). In the case of the raw adhering members A and B whose additive content in the adhesive is not more than a predetermined amount, for example, a groove-shaped half-cut of an inverted triangular cross sectional shape is provided by razor (blade) cutting, whereby adhering members satisfactory in stability and handleability can be obtained (Nos. 21 and 22). Furthermore, a half-cut having a groove width of 20 μm or less and a rectangular sectional shape is formed by die cutting, for example, adhering members with satisfactory stability and handleability can be obtained.

TABLE 1

Results by Laser Beam Machining

| No. | Raw adhering member | Machining conditions | Sectional shape | Handleability | Seepage of additive | Overall evaluation |
|---|---|---|---|---|---|---|
| 1 | A | Output 75% 400 mm/sec | Groove width ca 100 μm; liner, 7 to 8 μm, left uncut; height of protuberance ca 40 μm; rectangular shape | 1 | ○ | X*1 |
| 2 | A | Output 75% 360 mm/sec | Groove width ca 100 μm; liner, 2 to 3 μm, left uncut; height of protuberance ca 40 μm; rectangular shape | 3 | ○ | ○ |
| 3 | A | Output 75% 320 mm/sec | Groove width ca 120 μm; liner partially cut, and generally 1 to 2 μm left uncut; height of protuberance ca 40 μm; rectangular shape | 4 | ○ | ○ |
| 4 | A | Output 75% 260 mm/sec | Groove width ca 120 μm; groove depth ca 90 μm; height of protuberance ca 60 μm; rectangular shape | 5 | ○ | ○ |
| 5 | A | Output 75% 200 mm/sec | Groove width ca 180 μm; groove depth ca 110 μm; height of protuberance ca 60 μm; rectangular shape | 5 | — | ○ |
| 6 | A | Output 75% 70 mm/sec | Groove depth reaches the backing; rectangular shape | — | — | X |
| 7 | B | Output 75% 400 mm/sec | Groove width ca 100 μm; liner, 7 to 8 μm, left uncut; height of protuberance ca 40 μm; rectangular shape | 1 | ○ | X*1 |
| 8 | B | Output 75% 360 mm/sec | Groove width ca 100 μm; liner, 2 to 3 μm, left uncut; height of protuberance ca 40 μm; rectangular shape | 4 | ○ | ○ |
| 9 | B | Output 75% 320 mm/sec | Groove width ca 120 μm; liner partially cut, and generally 1 to 2 μm left uncut; height of protuberance ca 40 μm; rectangular shape | 5 | ○ | ○ |
| 10 | B | Output 75% 260 mm/sec | Groove width ca 120 μm; groove depth ca 90 μm; height of protuberance ca 60 μm; rectangular shape | 5 | XX | X |
| 11 | B | Output 75% 200 mm/sec | Groove width ca 180 μm; groove depth ca 110 μm; height of protuberance ca 60 μm; rectangular shape | 5 | XX | X |
| 12 | B | Output 75% 70 mm/sec | Groove depth reaches the backing; rectangular shape | — | — | X |
| 13 | C | Output 75% 400 mm/sec | Groove width ca 100 μm; liner, 7 to 8 μm, left uncut; height of protuberance ca 40 μm; rectangular shape | 1 | ○ | X*1 |
| 14 | C | Output 75% 360 mm/sec | Groove width ca 100 μm; liner, 2 to 3 μm, left uncut; height of protuberance ca 40 μm; rectangular shape | 5 | ○ | ○ |
| 15 | C | Output 75% 320 mm/sec | Groove width ca 120 μm; liner partially cut, and generally 1 to 2 μm left uncut; height of protuberance ca 40 μm; rectangular shape | 5 | ○ | ○ |

TABLE 1-continued

Results by Laser Beam Machining

| No. | Raw adhering member | Machining conditions | Sectional shape | Handleability | Seepage of additive | Overall evaluation |
|---|---|---|---|---|---|---|
| 16 | C | Output 75% 260 mm/sec | Groove width ca 120 μm; groove depth ca 90 μm; height of protuberance ca 60 μm; rectangular shape | 5 | XX | X |
| 17 | C | Output 75% 200 mm/sec | Groove width ca 180 μm; groove depth ca 110 μm; height of protuberance ca 60 μm; rectangular shape | 5 | XX | X |
| 18 | C | Output 75% 70 mm/sec | Groove depth reaches the backing; rectangular shape | — | — | — |

*[1]Failed to function as a half-cut

TABLE 2

Results by Razor Cutting

| No. | Raw adhering member | Cutting conditions | Sectional shape | Handleability | Seepage of additive | Overall evaluation |
|---|---|---|---|---|---|---|
| 21 | A | 30 m/min | Groove depth ca 100 μm; inverted triangular shape | 5 | — | ○ |
| 22 | B | 30 m/min | Groove depth ca 100 μm; inverted triangular shape | 4 | Δ | ○ |
| 23 | C | 30 m/min | Groove depth ca 100 μm; inverted triangular shape | 3 | XX | X |

TABLE 3

Results by Die Roll Machining

| No. | Raw adhering member | Machining conditions | Sectional shape | Handleability | Seepage of additive | Overall evaluation |
|---|---|---|---|---|---|---|
| 31 | A | Blade angle 20° | Groove width ca 10 μm; rectangular shape | 3 | — | ○ |
| 32 | A | Blade angle 30° | Groove width ca 15 μm; rectangular shape | 3 | — | Δ |
| 33 | A | Blade angle 45° | Groove width ca 20 μm; rectangular shape | 3 | — | Δ |
| 34 | B | Blade angle 20° | Groove width ca 10 μm; rectangular shape | 3 | Δ | ○ |
| 35 | B | Blade angle 30° | Groove width ca 15 μm; rectangular shape | 4 | Δ | ○ |
| 36 | B | Blade angle 45° | Groove width ca 20 μm; rectangular shape | 4 | X | Δ |
| 37 | C | Blade angle 20° | Groove width ca 10 μm; rectangular shape | 3 | Δ | Δ |
| 38 | C | Blade angle 30° | Groove width ca 15 μm; rectangular shape | 4 | Δ | Δ~○ |
| 39 | C | Blade angle 45° | Groove width ca 20 μm; rectangular shape | 4 | X | Δ~X |
| 40 | C | Blade angle 20° | Groove width ca 15 μm; rectangular shape | 3 | XX | Δ |

According to the present invention, the releasability of the liner and the handleability of the adhering member can be improved, without involving a further cost, by forming the half-cut in the liner, the half-cut having a predetermined groove width, a predetermined groove depth, and a rectangular or inverted triangular sectional shape.

If the thickness of the liner is designated as T, for example, the half-cut having a groove width of 200 μm or less, and a groove depth of more than 14T/15, but less than T is provided in the liner, whereby the releasability of the liner can be ensured without deterioration in stability.

In providing the half-cut having a groove width of 50 μm or more and a rectangular sectional shape, it is preferred to provide protuberances on the surface of the liner along and on both sides of the half-cut. Because of this structure, the handleability of the adhering member, especially the releasability of the liner, can be further improved.

Any of these half-cuts can be easily provided, for example, by irradiation with laser beams, cutting with a razor (blade), or die cutting.

Hence, an improvement in handleability can be easily achieved, without deterioration in stability, by selecting an appropriate sectional shape of the half-cut according to the characteristics of the adhesive. Furthermore, the problems of stability and handleability can be solved, with no need to use an expensive machine, etc., and by a method advantageous in terms of cost.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. An adhering member comprising:
    a backing;
    an adhesive layer of a thickness R formed on one surface of the backing; and
    a liner of a thickness T laminated on the adhesive layer,
    wherein a half-cut having a groove shape is formed in the liner so as to form the liner into at least two liner pieces having end portions with a gap therebetween,
    wherein a protuberance is provided at groove edge portions along each of the end portions and the height of the protuberance is 30 to 100 μm, and
    wherein the half-cut has a groove depth of more than 14T/15, but less than T.

2. The adhering member according to claim 1, wherein the adhesive layer contains less than 25% by weight of an additive for adjusting adhesiveness.

3. The adhering member according to claim 1, wherein the groove shape of the half-cut is a rectangular shape in cross-section.

4. An adhering member according to claim 1, wherein the adhesive layer contains not less than 25% by weight but less than 70% by weight of an additive for adjusting adhesiveness, and the groove shape of the half-cut has a rectangular sectional shape, and the groove depth is more than 14T/15 but less than T.

5. The adhering member according to claim 1, wherein a sectional shape of the protuberance is semi-circular.

* * * * *